United States Patent Office 2,826,597
Patented Mar. 11, 1958

2,826,597
STABILIZER FOR RESINS

Carl R. Gloskey, Avenel, N. J., assignor to Metal & Thermit Corporation, New York, N. Y., a corporation of New Jersey No Drawing. Application January 22, 1953
Serial No. 332,763

11 Claims. (Cl. 260—429.7)

The present invention relates to organotin mixed salts of monobasic acids and maleic acid having utility as stabilizing agents for resins and the like, particularly for halogen containing materials, and to processes for manufacturing the same.

The compounds of this invention are organotin derivatives of mixed maleic acid and a monocarboxylic acid and may be generally designated as condensation products of organotin compounds with maleic acid and a monocarboxylic aliphatic acid. They may be illustrated by the following structural formula:

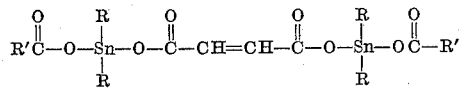

wherein R is an alkyl, aryl or aralkyl group, R' is an alkyl radical. Thus R may be any organic radical such as methyl, ethyl, propyl, butyl, lauryl, phenyl, benzyl, etc. Similarly, R' may be derived from any monobasic aliphatic acid such as acetic, butyric, caproic, lauric, palmitic, oleic, behenic, etc.

The organotin derivatives of this invention are stabilizers for resins, particularly polyvinyl chloride containing resins, in quantities as low as ½% of the weight of the resin. This stabilizing property is equally applicable to resin plasticizer compositions.

In particular, the organotin mixed salts of this invention are excellent stabilizers for plastic compositions comprising polyvinylchloride homo- and co-polymers and have certain highly desirable properties lacking in stabilizers of the prior art. Thus, it is known that organotin salts of monocarboxylic acids can be used as stabilizers for polyvinyl chloride resin compositions but such agents do not always prevent discoloration of the plastic during the time required for processing, especially when the processing is carried out at high temperatures or when scrap stock is re-run. Plastics, formulated with such stabilizers, tend, in general, to have slight yellow cast even with short processing cycles and this is often objectionable. Similarly, organotin maleate salts have heretofore been proposed as stabilizers for polyvinyl chloride plastics. While these are usually superior to the organotin salts of monocarboxylic acids in the sense that they protect against discoloration for longer processing times and yield less-colored products, they have several serious defects which restrict their use and otherwise make their use disadvantageous, namely:

(A.) They are solid materials, not readily soluble in the plasticizers commonly used. This is particularly inconvenient for plastisols since the solid maleate has ordinarily to be ball-milled with the plasticizer in order to insure complete dispersion.

(B.) Films stabilized with organotin maleate are subject to blooming and spewing, especially when the films are exposed to sunlight.

(C.) Formulations containing dibutyltin maleate as stabilizer tend to stick to mill and calendar rolls during processing.

The mixed organotin salts of maleic acid and a monocarboxylic acid possess many unusual properties, rendering the same particularly suitable as superior stabilizers for chlorine-containing resin compositions and the like. Thus, the mixed organotin salts of this invention are substantially all liquids which are soluble in the common plasticizers. Furthermore, plastics containing these stabilizers are free from early yellowing, resist darkening by heat for long periods of time and are considerably less subject to blooming, spewing and mill sticking than those stabilized with dibutyltin maleate.

The properties of the mixed organotin salts of this invention are not, as might be expected, the additive resultant of the properties of an organotin maleate and an organotin salt of a monocarboxylic acid. This is easily demonstrated for the property of spewing. A plastic sheet was prepared by milling together 100 parts of polyvinyl chloride resin, 50 parts of di-2-ethylhexyl phthalate and 0.9 part of dibutyltin maleate. This sheet was given a polished surface by pressing between heated, chromium-plated plates in a hydraulic press for 5 minutes at 300° F. The polished sheet was suspended 6 inches from a window with eastern exposure. When examined after 7 days of exposure the sample had spewed.

This test was then repeated except that 3 parts of a dibutyltin mixed laurate-maleate salt replaced the 0.9 part of dibutyltin maleate used above. Stoichiometrically, 3 parts of the mixed salt was equivalent to a mixture of 2.1 parts dibutyltin dilaurate and 0.9 parts of dibutyltin maleate. Thus the plastic sheet contained the same amount of maleate as in the first test. However in this test no spewing was observed even though the exposure was continued for 30 days.

This lack of spewing was not due to any simple solubilizing effect of dibutyltin dilaurate. For, when the test was again repeated, this time using 2.1 parts of dibutyltin dilaurate and 0.9 part of dibutyltin maleate added separately to the formulation in place of the 3 parts of the mixed salt, the plastic sheet spewed in 7 days.

This last result was especially surprising since it would have been expected that the two salts would have interacted to form the mixed salt under the influence of heat during the milling of the formulation. It is believed that under some conditions of milling such a reaction would take place forming the mixed salt and providing a non-spewing plastic material.

While the invention is not limited to any particular theory, the improved results obtained with the mixed salts of this invention may be best explained by the theory that the shortcomings of the maleate salt are due to its polymeric nature. Dibutyltin maleate is ordinarily a polymer since it is the product of the reaction of two bifunctional reagents. By limiting the opportunity for polymer formation by tying up one of the functions on part or all of the dibutyltin oxide with a monobasic acid, the serious defects of the maleate salt aforedescribed are eliminated. Thus, by reacting two moles of organotin oxide, two moles of a monobasic acid and one mole of maleic anhydride, the predominant tendency would be to form the monomeric product.

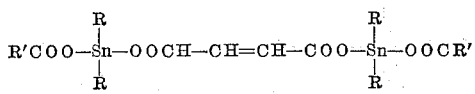

Less monobasic acid and correspondingly more maleic anhydride would probably yield a polymer, but one whose length was limited. However, we have found that the product with about two moles of monobasic acid and one mole of maleic acid are the most advantageous.

The organotin compounds having the above formula may be prepared by reacting an organotin oxide with a mixture of maleic acid or, preferably, maleic anhydride and a monobasic aliphatic acid, under conditions of elevated temperature and for a sufficient period of time to effect complete reaction therebetween.

Stoichiometric quantities of the ingredients may be used. Thus the reaction may be carried out using two moles of monocarboxylic acid, one mole of maleic anhydride and two moles of organotin oxide. It is preferred to use slightly more than the stoichiometrical quantity of monobasic acid and correspondingly less of the maleic acid (or anhydride). Thus the ratio of monobasic to maleic acid may vary from 2:1 to 3:1, a preferred ratio being about 2.5:1. The amount of organotin oxide should be substantially that required to react with all the acid groups.

Any suitable reaction temperatures may be employed. It is ordinarily preferred to use elevated temperatures on the order of about 100° C., in order to remove the water of reaction as it is produced during the reaction. Such reaction can be carried out at lower temperatures, however, and the water removed from the reaction product subsequently by further heating or other suitable means.

Another embodiment of this invention is the use of inert organic solvents as the medium for the reaction, such as toluene, benzene, etc. The presence of such solvent facilitates the desired reaction. The solvent may be eliminated from the reaction product at the completion of the reaction by any suitable means. This may be accomplished by vaporizing the solvent under vacuum at elevated temperatures, or by other suitable means.

The following examples are further illustrative of the organotin derivatives of a mixture of a monobasic acid and maleic acid and their preparation, and it will be understood that the invention is not limited thereto:

Example I

Two moles of lauric acid were used to dissolve one mole of maleic anhydride. Two moles dibutyltin oxide were added to the liquid mixture and heated to 100° C. for 5 minutes. The resultant compound was filtered, yielding bis(dibutyltin monolaurate) maleate.

Example II

The procedure of Example I was repeated using one mole of acetic anhydride in lieu of lauric acid. An immediate exothermic reaction took place and the reaction temperature rose from 30° to 90° C. in less than one minute. The resultant product was bis(dibutyltin monoacetate) maleate.

Example III

The same procedure as in Example I was followed utilizing behenic acid instead of lauric acid. The reaction time was 15 minutes. The product was filtered hot and solidified upon cooling, yielding bis(dibutyltin monobehenate) maleate.

It has also been discovered and is a feature of this invention that the organotin mixed salts of a monobasic acid and maleic acid will function as stabilizers for resin compositions, particularly those containing polyvinyl chloride or its co-polymers, and when intimately dispersed therein, will provide plastic compositions of improved resistance to heat and light deterioration. Excellent films are obtained from the aforesaid plastic compositions which exhibit a high degree of stability. The optimum concentration of the aforesaid organotin derivatives, useful as a stabilizer is about ½–3% based on the weight of the vinyl resin, although ½–10% may also be utilized. The resin composition containing this concentration of stabilizer produces a stable plastic film, which darkens only slowly at elevated temperatures.

The following examples illustrate the preparation and testing of polyvinyl chloride plastics employing the organotin mixed salts of this invention as stabilizers. In the examples, parts are by weight.

Example IV 100 parts of Geon 101 (a polyvinyl chloride homopolymer resin), 40 parts of di-2-ethylhexyl phthalate and 1 part of the product of Example I were blended and then milled for 5 minutes on a two-roll, differential speed mill at 320° F. The milled material was taken off the mill as a sheet of about 40 mils thickness. Portions of the sheet were press-polished in a heated, chromium-plated mold. Samples of the press-polished sheet were placed in a circulating air oven at 320° F. and removed from the oven after 1, 2, 3 and 4 hours. Even after 4 hours the degree of darkening was slight.

Example V

The process of Example IV was repeated except that the product of Example II was substituted for the product of Example I in the formulation. As in Example IV, the plastic sheet was darkened only slightly as a result of heating to 320° F. for four hours.

Example VI

The process of Example IV was repeated except that the product of Example III was substituted for the product of Example I in the formulation. Again, the resulting plastic sheet darkened only slightly after four hours' exposure at 320° F.

Other uses of the organotin derivatives are as stabilizers for other chlorinated materials, as rubber accelerators, rubber anti-oxidants, lube oil additives, and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A compound having the formula:

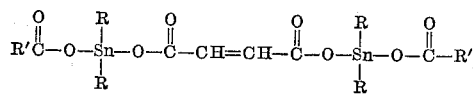

wherein R is selected from the group consisting of alkyl, phenyl and benzyl radicals, and R' is an alkyl radical.

2. Bis (dibutyltin monolaurate) maleate.
3. Bis (dibutyltin monoacetate) maleate.
4. Bis (dibutyltin monobehenate) maleate.
5. Bis (diphenyltin monolaurate) maleate.
6. A method of preparing a dihydrocarbon mixed salt of a fatty acid and maleic acid which comprises reacting, on a molar basis, about one mole of a dihydrocarbontin oxide selected from the group consisting of alkyltin oxides, phenyltin oxides and benzyltin oxides with about one mole of a fatty acid and about ½ mole of maleic anhydride, and recovering the reaction products.
7. A method of preparing dihydrocarbontin mixed salts as set forth in claim 6, wherein said reaction takes place in the presence of an inert organic solvent.
8. As a new composition of matter a dihydrocarbontin mixed salt of a fatty acid and maleic acid wherein the hydrocarbon groups bonded to tin are selected from the class consisting of alkyl, phenyl and benzyl radicals and where a tin atom is connected to the carbon atom of at least one carboxyl group of the maleic acid through an oxygen atom linkage.
9. A method of preparing a dihydrocarbontin mixed salt of a fatty acid and maleic acid which comprises reacting a hydrocarbontin oxide selected from the class consisting of alkyltin oxides, phenyltin oxides and benzyltin oxides with a mixture of a fatty acid and maleic anhydride and recovering the desired salt.
10. A composition of matter according to claim 8, wherein the hydrocarbon groups bonded to tin are alkyl radicals.

11. A compound according to claim 1, wherein R is an alkyl radical.

References Cited in the file of this patent

UNITED STATES PATENTS

| | | |
|---|---|---|
| 2,267,778 | Ingve | Dec. 30, 1941 |
| 2,344,002 | Rugeley | Mar. 14, 1944 |
| 2,417,071 | Gebhart et al. | Mar. 11, 1947 |
| 2,569,492 | Passino et al. | Oct. 2, 1951 |
| 2,581,913 | Smith et al. | Jan. 8, 1952 |
| 2,625,533 | Williams | Jan. 13, 1953 |